(12) United States Patent
Phillips (10) Patent No.: US 7,644,118 B2
(45) Date of Patent: Jan. 5, 2010

(54) METHODS, SYSTEMS, AND MEDIA TO ENHANCE PERSISTENCE OF A MESSAGE

(75) Inventor: Brent Russell Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 621 days.

(21) Appl. No.: 10/660,289

(22) Filed: Sep. 11, 2003

(65) Prior Publication Data

US 2005/0060374 A1 Mar. 17, 2005

(51) Int. Cl.
*G06F 15/16* (2006.01)

(52) U.S. Cl. ............... 709/201; 709/206; 709/216; 709/217; 710/1; 710/20; 710/54

(58) Field of Classification Search .......... 709/201, 709/206, 215, 217, 223, 224, 229, 314, 216; 710/1, 20, 54
See application file for complete search history.

(56) References Cited

U.S. PATENT DOCUMENTS

| | | | | |
|---|---|---|---|---|
| 6,088,659 | A * | 7/2000 | Kelley et al. | 702/62 |
| 6,141,701 | A * | 10/2000 | Whitney | 710/5 |
| 6,289,385 | B1 * | 9/2001 | Whipple et al. | 709/229 |
| 6,523,103 | B2 | 2/2003 | Page | |
| 6,910,154 | B1 * | 6/2005 | Schoenthal | 714/18 |
| 6,920,476 | B2 * | 7/2005 | McGann et al. | 709/201 |
| 6,934,948 | B2 * | 8/2005 | Mikalsen et al. | 718/101 |
| 7,020,697 | B1 * | 3/2006 | Goodman et al. | 709/223 |
| 7,024,472 | B1 * | 4/2006 | Datta et al. | 709/223 |
| 7,058,955 | B2 * | 6/2006 | Porkka | 719/314 |
| 7,127,507 | B1 * | 10/2006 | Clark et al. | 709/224 |

(Continued)

FOREIGN PATENT DOCUMENTS

WO WO-0167263 A1 9/2001

OTHER PUBLICATIONS

L. Taylor, M. Cobbett, P. van-Leersum, "Use of The Intelligently Adaptive Databse for Message Store in Implementation of Message Products Such as IBM MQSeries Every Place Message Queue", Research Disclosure, Apr. 2001, n444 Apr. 2001 Art. 192, pp. 691-692.

(Continued)

*Primary Examiner*—William C Vaughn, Jr.
*Assistant Examiner*—Djenane M Bayard
(74) *Attorney, Agent, or Firm*—William H. Steinberg; Schubert Osterrieder & Nickelson PLLC (57) ABSTRACT

Methods, systems, and media for enhancing persistence of a message are disclosed. Embodiments include hardware and/or software for storing of a message in an inbound queue, copying the message to a working queue prior to removing the message from the inbound queue, processing the message base upon the copy in the working queue, and storing a committed reply for the message in an outbound queue. Embodiments may also include a queue manager to persist the message and the committed reply after receipt of the message, to close or substantially close gaps in persistence. Several embodiments include a dispatcher that browses the inbound queue to listen for receipt of messages to process, copy the message to the working queue, and assign the message to a thread to perform processing associated with the message. Further embodiments include persistence functionality in middleware, alleviating the burden of persisting messages from applications like upperware.

20 Claims, 4 Drawing Sheets

U.S. PATENT DOCUMENTS

| | | |
|---|---|---|
| 2001/0013051 A1* | 8/2001 | Nakada et al. ............... 709/202 |
| 2001/0047390 A1 | 11/2001 | McGann et al. |
| 2002/0004835 A1 | 1/2002 | Yarbrough |
| 2002/0055983 A1* | 5/2002 | Goddard ..................... 709/217 |
| 2002/0059316 A1 | 5/2002 | Kettley et al. |
| 2002/0062356 A1 | 5/2002 | Clarke et al. |
| 2002/0069157 A1 | 6/2002 | Jordan |
| 2002/0078132 A1 | 6/2002 | Cullen et al. |
| 2002/0078258 A1 | 6/2002 | Williams |
| 2002/0152422 A1 | 10/2002 | Sharma et al. |
| 2002/0174260 A1 | 11/2002 | Huang |
| 2003/0009511 A1 | 1/2003 | Giotta et al. |
| 2003/0033349 A1* | 2/2003 | Lambert et al. ............. 709/201 |
| 2003/0046586 A1 | 3/2003 | Bheemarasetti et al. |
| 2003/0105800 A1* | 6/2003 | Cullen ........................ 709/201 |
| 2003/0182464 A1* | 9/2003 | Hamilton et al. ............ 709/314 |
| 2003/0191978 A1 | 10/2003 | Kitamorn et al. |
| 2004/0153511 A1* | 8/2004 | Maynard et al. ............ 709/206 |
| 2005/0060374 A1* | 3/2005 | Phillips ...................... 709/206 |

OTHER PUBLICATIONS

B. Buxton, S. Walker, S. Hobson & P. Hopewell, "Minimize Fuzzy Backup Costs by Initial Filtering of Eligible Messages", Research Disclosure, Jan. 2002, n453 Jan. 2002 Atr. 93, p. 79.

King, RP, "Persistent Message Mover Non-wait Protocol", U.S. Appl. No. 09/482,477, filed Jan. 12, 2000.

Vincent, R. and Roy, M., "Non-Persistent Service Support In Transactional Application Support Environments", U.S. Appl. No. 10/350,672, filed Jan. 24, 2003.

* cited by examiner

METHODS, SYSTEMS, AND MEDIA TO ENHANCE PERSISTENCE OF A MESSAGE

FIELD OF INVENTION

The present invention is in the field of message queuing. More particularly, the present invention relates to methods, systems, and media to enhance persistence of a message, such as an edit and create message, to substantially avoid loss of the message after receipt.

BACKGROUND

Demands on computer systems to perform greater numbers of complex and critical functions has led to the distribution of functions, or portions thereof, to specialized systems. These specialized systems can then be optimized for specific tasks to increase efficiency at the expense of being loosely coupled, which increases the complexities involved with system integration.

For some specialized systems, the complexity of full integration can be infeasible and has been avoided by maintaining redundant data, and applications to process the data. In an engineering company, for example, significant differences exist between systems for accounting and engineering groups. The accounting systems maintain data related to budget, man-hours, pay scales, and taxes, while the engineering systems maintain data related to engineering analyses, materials, designs, man-hours and budget. Although access to data regarding man-hours, budgets, and budgetary projections for the engineering groups by the accounting system is necessary, the costs involved with integrating these systems may be much more than costs involved with maintenance of redundant databases. On the other hand, maintenance of redundant data increases the difficulty associated with ensuring that the data is correct, or updated in a timely manner, and ensuring that processes such as budget projections designed to manipulate the data, do so accurately, especially when databases are revised or differ between various engineering groups or disciplines.

One solution to combat the complexities involved with integration of loosely coupled, specialized systems and the maintenance of redundant databases and processes, is to incorporate a common interface such as a middleware application on each of the specialized systems. The middleware applications, such as IBM's message queuing MQSeries™ and WebSphere™ applications, facilitate messaging systems that allow one system to gather data from another system.

As the messaging systems between the multiple, specialized systems become more prevalent and systems become more dependent upon the communications, system failures become a more critical problem, causing other, linked systems to hang-up or fail. In particular, messages may be lost as a result of a system failure and, for some critical communications, the loss of a message can cause the process that requested data to fail. This problem is exacerbated when an intermediate system is involved with the communications. For example, a workstation may request data associated with a server. The server may generate the data by requesting and processing data from one or more hosts. If the server fails, the original message from the workstation and/or the requests for the hosts may be lost. When the server is restarted, the server may be unable to recover the message and associate the replies from the hosts with the message even though the workstation may still be waiting for the data requested by the original message.

Message persistence is implemented by such systems to attenuate the problems encountered as a result of system failures. Message persistence, or persisting the message, refers to storing the message in a manner that allows the message to be recovered after volatile memory is lost. For instance, a message queue may reside in volatile memory and, as a result of a system failure, the contents of the queue are lost or invalidated. A persisted message for that queue, which is stored in, e.g., non-volatile memory, can then be recovered, allowing the message to be processed. On the other hand, message persistence typically involves a trade-off with response time. In current solutions, upperware applications invoked to process messages may store the message to non-volatile data storage. Messages may be placed in an inbound queue upon acceptance and stored directly to the non-volatile storage after removing the message from the inbound queue. If a system failure occurs while processing the message, the original message can be found in the non-volatile memory and processing can start over. However, persisting the message to non-volatile memory via upperware can increase latencies in response time significantly and leave gaps in the persistence that may allow the message to be lost such as the gap between removing the message from the inbound queue and storing the message in non-volatile memory.

SUMMARY OF THE INVENTION

The problems identified above are in large part addressed by methods, systems, and media to enhance persistence of a message. One embodiment provides a method for enhancing persistence of a message. The method generally includes browsing an inbound queue to identify the message; copying the message to a working queue, the working queue being persisted by a queue manager, to persist the message before the message is removed from the inbound queue; and processing the message to generate a reply prior to removing the message from the working queue.

Another embodiment provides an apparatus for enhancing persistence of a message. The apparatus contemplates an inbound queue to receive the message from a requestor; a working queue to store the message; a queue manager to persist the message from the working queue before the message is removed from the inbound queue; and a dispatcher to browse the inbound queue to identify the message, copy the message to the working queue, remove the message from the inbound queue after the message is persisted from the working queue, and assign a thread to process the message, generating a reply in response to the message.

A further embodiment provides a machine-accessible medium containing instructions, which when executed by a machine, cause said machine to perform operations. The operations can involve browsing an inbound queue to identify a message; copying the message to a working queue, the working queue being persisted by a queue manager, to persist the message before the message is removed from the inbound queue; and processing the message to generate a reply prior to removing the message from the working queue.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media to enhance persistence of a message are contemplated. Embodiments include hardware and/or software for storing of a message in an inbound queue, copying the message to a working queue prior to removing the message from the inbound queue, processing the message based upon the copy in the working queue, and storing a committed reply for the message in an outbound queue. A queue manager may persist the message and the committed reply after receipt of the message, to close or substantially close gaps in persistence. Several embodiments include a dispatcher that browses the inbound queue to listen for incoming messages to process, copy the messages to the working queue, and assign the messages to threads to process the messages. Further embodiments include persistence functionality in middleware, alleviating the burden of persisting messages from applications in upperware.

Figure 1:
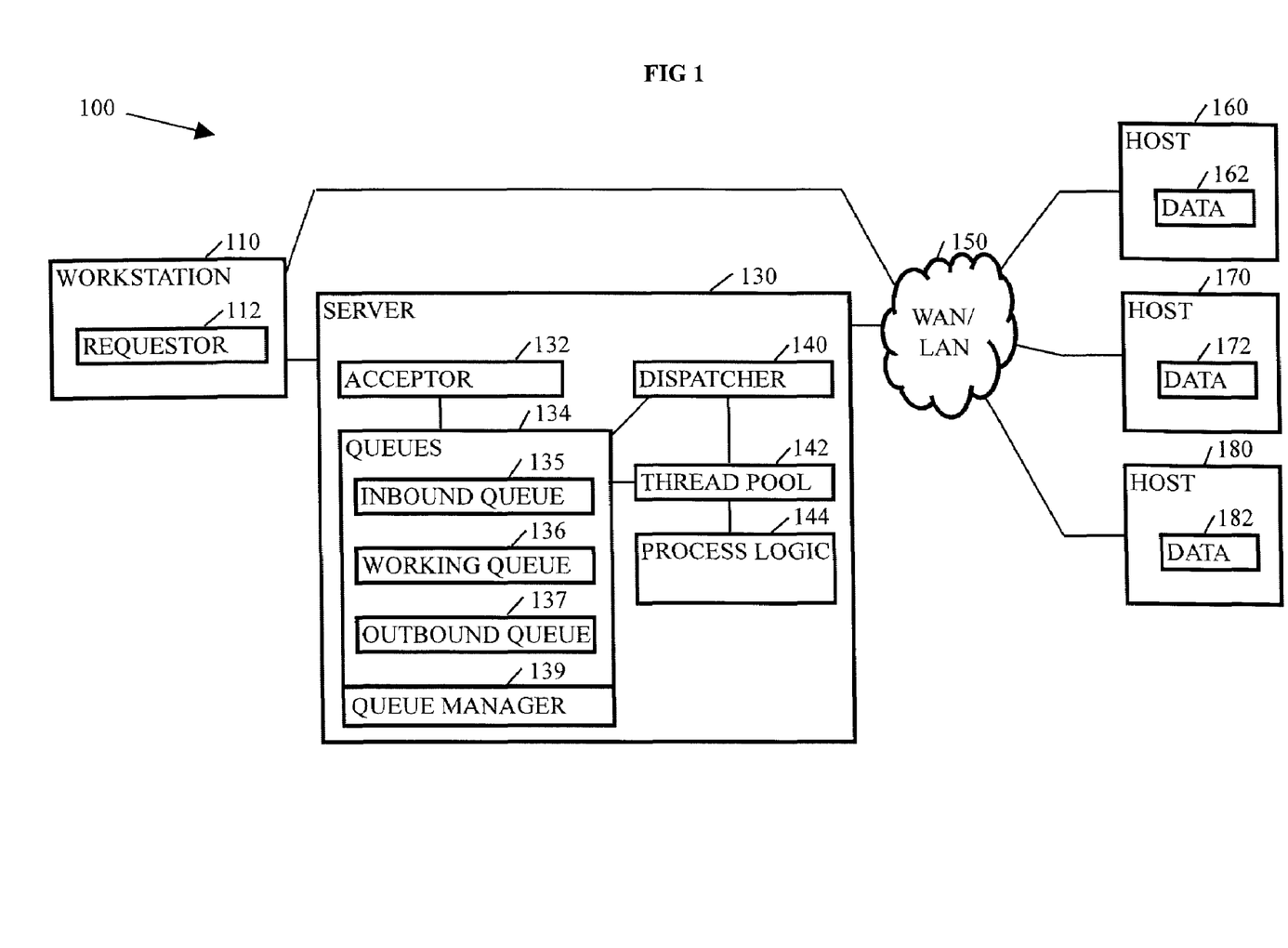
FIG. 1 depicts an embodiment of a system including an workstation, server, and hosts coupled via a LAN and/or WAN to enhance persistence of a message.

Turning now to the drawings, FIG. 1 depicts an embodiment of a system 100 to enhance persistence of a message. More specifically, system 100 may facilitate communication of messages like requests, replies, and informs (messages in which no response is expected). The messages may facilitate communication between various computer systems of a local area network or wide area network to obtain and/or process data. In many embodiments, system 100 may include computers such as workstations, servers, mobile computers, personal digital assistants (PDAs) and the like that request, process, and/or maintain data. In several embodiments, the computers may include a middleware like IBM's MQSerie™ to provide an interface so applications can access data and data processing capabilities of other computers.

System 100 includes a workstation 110, a server 130, a wide area/local area network (WAN/LAN) 150, and hosts 160, 170, and 180. Workstation 110 may provide a graphical user interface (GUI) for a user to display data gathered from server 130 and/or hosts 160, 170, and 180. Workstation 110 includes requestor 112. Requestor 112 may generate a message to request data for processing a user-initiated transaction. The message may include fields and be associated with one or more rules to instruct a thread of, e.g., server 130 or host 160, to gather and/or process data, generate a reply based upon the data gathered and/or processed, and transmit the reply to workstation 110. For example, the user of workstation 110 may be a loan officer and requestor 112 may generate one or more messages to process a loan application. In particular, the loan officer may execute an application to generate a credit worthiness report about a customer and requestor 112 may request data about the customer and the customer's bank accounts, investments, and credit history to generate the report. Requestor 112 may transmit a first message to the customer, host 160, to obtain additional information about the customer and transmit a second message to server 130 to obtain data about the customer's bank accounts, investments, and credit history. In response to the first message, host 160 may generate a reply based upon data 162 stored in host 160. In response to the second message, server 130 may obtain data about the customer's bank accounts, investments, and credit history. Server 130 may receive the second message and generate two intermediate messages to gather the data. The first intermediate message may be directed toward host 170 to gather data 172 about the customer's accounts and investments. The second intermediate message may be directed toward host 180 to gather data 182 about the customer's credit history. Upon receipt of intermediate replies to the two intermediate messages, server 130 may generate a reply to the message from workstation 110 (including one or more messages) and transmit the reply to workstation 110.

Server 130 may include a computer system such as an IBM eServer™ having one or more processors, or threads of processors, executing software and/or one or more state machines coupled with data storage devices such as random access memory (RAM), read only memory (ROM), flash memory, compact disc drives, hard drives, and the like. Software executing on server 130 may be adapted to receive, process, and respond to messages. The software may also be adapted to gather and return data from server 130 or other computer systems coupled with WAN/LAN 150 that have compatible messaging software and/or data storage. Server 130 may include an acceptor 132, queues 134, a queue manager 139, a dispatcher 140, a thread pool 142, and process logic 144.

Acceptor 132 may receive and verify acceptable messages for server 130. In particular, acceptor 132 may recognize a message addressed to server 130 from workstation 110 or WAN/LAN 150, verify that the message is in a format that can be interpreted by server 130 and store accepted messages in inbound queue 135 of queues 134. In some embodiments, acceptor 132 may verify the integrity of the message via cyclical redundancy checking (CRC) or other error checking methods.

Queues 134 may provide persistent queues for storing messages. In many embodiments, local queue manager 139, which stores the contents of queues 134 in non-volatile memory periodically, or when messages are added to queues 134, manages the persistent queues. In many embodiments, queues 134 are maintained and persisted by middleware applications and are essentially invisible to upperware applications.

Queues 134 include inbound queue 135, working queue 136, and outbound queue 137. Inbound queue 135 may receive messages accepted by acceptor 132 and persist the messages until dispatcher 140 retrieves the messages for processing. Working queue 136 may maintain messages copied from inbound queue 135 until committed replies are generated in response to the corresponding messages or until removed by a thread of thread pool 142. Outbound queue 137 may persist replies to messages until the replies are transmitted to respective requesters. For example, upon receiving a message from workstation 110, acceptor 132 may verify that the message meets minimal requirements for processing the message such as the organization of fields in the message and the type of message. Acceptor 132 may also verify that the contents of one or more of the fields fall within a set of acceptable field values. Then acceptor 132 stores the message in inbound queue 135. When processing of the message begins, the message may be copied from inbound queue 135 to working queue 136 and removed from inbound queue 135 to facilitate receipt of additional messages. Working queue 136 stores the message while a thread from thread pool 142 may process the message and outbound queue 137 stores the resulting reply until the message is transmitted to the requester such as requestor 112.

Dispatcher 140 may monitor inbound queue 135 for new messages to copy to working queue 136, copy the messages to working queue 136, and assign threads from thread pool 142 to process the messages. In many embodiments, dispatcher 140 may browse or search for one or more messages to process that have not yet been copied to the working queue 136. In some of these embodiments, dispatcher 140 may periodically search inbound queue 135.

Dispatcher 140 may advantageously remove the messages from inbound queue 135 after the messages are copied to working queue 136 so the messages are persisted by local queue manager 139 before the messages are removed from inbound queue 135. Local queue manager 139 may be middleware that periodically or incrementally persists messages.

Thread pool 142 may include available, working, and dirty threads associated with one or more processors to process messages stored in working queue 136. The threads may store a committed reply for the message in outbound queue 137 prior to removing the message from working queue 136, advantageously maintaining persistence via local queue manager 139 from receipt of the message until a committed reply is stored and persisted in outbound queue 137. For example, when a system failure such as the shutdown of server 130 may occur after receipt of a message by inbound queue 135 and before a reply is generated, the persisted messages can be restored to working queue 136 and processed upon restarting server 130. In addition, when a system failure occurs after a committed reply is stored in outbound queue 137 but before the reply is transmitted to the requestor, the reply may be transmitted upon start up of server 130. In further embodiments, when this persistence is accomplished via a middleware application, the applications executing via the middleware application may be designed for efficiency without regard for persistence since persistence is inherent to processing messages.

Thread pool 142 may include one or more threads that may recognize and perform a process based upon data embedded in a message relating the message to the process such as a process of gathering data 162 from host 160. In some embodiments, message may be in a pre-defined format that can be deciphered by the thread. In further embodiments, messages may be in a variable format, identified and/or defined by data included in the message. In several embodiments, messages include XML documents that may be executed by any thread. For example, dispatcher 140 may copy a message from inbound queue 135 to working queue 136. Then, dispatcher 140 may assign the next available thread of thread pool 142 to process the message from the copy in working queue 136. After the thread completes the processing, the thread may be dirty, having variables or the like containing data related to processing the message, so the thread is cleaned before becoming available to process another message.

Process logic 144 may include software such as upperware to perform a process or task based upon data included in a message. For instance, the message may include data representing a request for data 172 from host 170. Process logic 144 may include logic to gather data from data 172 and generate a reply to requestor 112 or originator of the message.

Further, process logic 144 may include instructions to store the reply in outbound queue 137 and transmit the reply. In some embodiments, process logic 144 may include logic managers such as a business logic manager or a presentation logic manager.

Business logic managers may select a business logic process to generate messages to gather information from one or more hosts and organize and/or filter the data received. Presentation logic managers may select a presentation logic process to interface with a GUI to present data to a user of server 130. For instance, a presentation logic manager may select a process to display the status of messages received by server 130 as well as the number of messages currently being processed.

WAN/LAN 150 is a network connection to couple workstation 110 and server 130 with user computers such as hosts 160, 170, and 180 to transmit messages between the computers. In some embodiments, WAN/LAN 150 may include a network in an office coupled via Ethernet, optical media like OPTICONNECT™, or the like. In some embodiments, WAN/LAN 150 also couples with the Internet via a cable modem, a direct subscriber line (DSL), a T1 line, a T3 line, or the like. In further embodiments, WAN/LAN 150 may include a network of temporary connections such as connections via a telephone system. In other embodiments, one or more user computers like host 170 may couple with workstation 110 directly.

Hosts 160, 170, and 180 may include computers that maintain data 162, 172, and 182, and facilitate access to the data by one or more computers coupled with WAN/LAN 150 such as other hosts, server 130, and workstation 110. In some embodiments, hosts 160, 170, and 180 may include a middleware application such as IBM's MQSeries™ or WebSphere™. Otherwise, data 162, 172, and 182 may include information stored in a format that may be parsed by one or more processes accessible to server 130, workstation 110, and/or other hosts.

Figure 2:
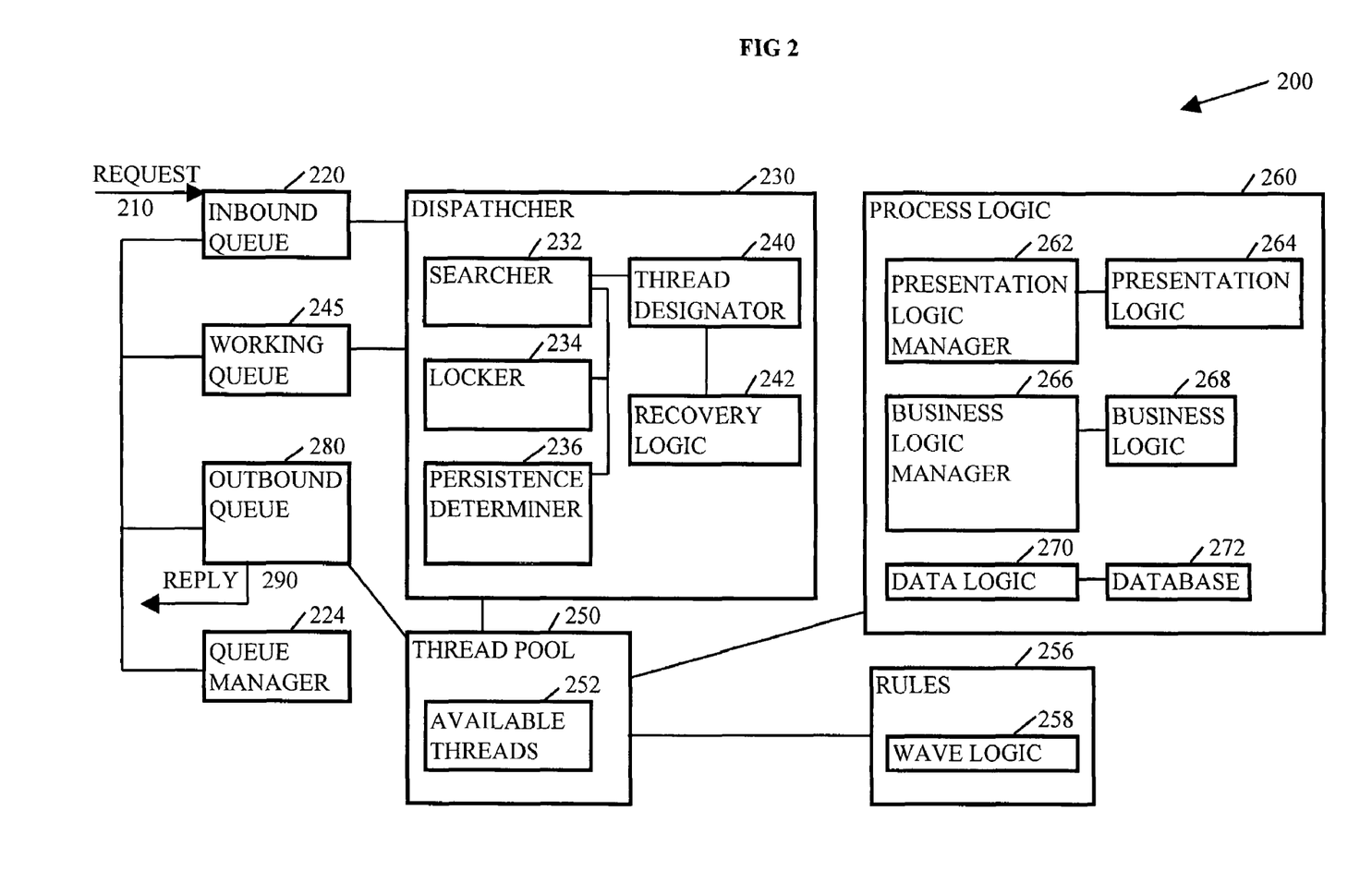
FIG. 2 depicts an embodiment of an apparatus including queues, a dispatcher, a thread pool, and process logic to enhance persistence of a message.

Referring now to FIG. 2, there is shown an embodiment of an apparatus 200 to enhance persistence of a message. Apparatus 200 may receive a message, request 210, at inbound queue 220, process request 210, and store a reply 290 for request 210 in outbound queue 280 while persisting request 210, or reply 290 substantially continuously from receipt of request 210 until transmitting reply 290. Apparatus 200 may include inbound queue 220, queue manager 224, dispatcher 230, working queue 245, thread pool 250, rules 256, process logic 260, and outbound queue 280.

Inbound queue 220 may store one or more messages received from applications and/or other computers until dispatcher 230 removes the messages for processing. In particular, inbound queue 220 may receive request 210 from a requestor and queue manager 224 may persist request 210. In many embodiments, queue manager 224 may monitor queues such as inbound queue 220, working queue 245, and outbound queue 280, and persist entries periodically or incrementally upon receipt. In some embodiments, when queue manager 224 persists entries periodically, queue manager 224 may persist the new entries or recent entries. Queue manager 224 may then restore the persisted entries in the event of, e.g., a system failure in which the contents of the queues are cleared, or otherwise lost.

Dispatcher 230 may browse inbound queue 220, copy new messages to the working queue 245, remove the new messages from inbound queue 220 after the new messages are persisted via working queue 245 and queue manager 224, and assign a thread from available threads 252, to the message to implement process logic 260. Dispatcher 230 may include searcher 232, locker 234, persistence determiner 236, thread designator 240 and recovery logic 242.

Searcher 232 may search or browse inbound queue 220 to locate one or more messages to be processed. In particular, searcher 232 may select request 210 after request 210 is received by inbound queue 220. Then, in some embodiments, locker 234 may lock request 210 to indicate that dispatcher 230 is copying or going to copy request 210 to the working queue 245. In several embodiments, searcher 232 may select messages based upon the order in which the messages are received by inbound queue 220. For example, request 210 may be part of a wave, or a set of messages designed for simultaneous or substantially simultaneous processing. More specifically, the wave may request data in more than one request and the data may be combined or collated to generate a committed reply to return to the corresponding requester. Searcher 232 may select the messages of the wave in a chronologically adjacent order to facilitate generation of the reply. In further embodiments, searcher 232 may select messages based upon priorities associated with the messages stored in inbound queue 220. In one embodiment, searcher 232 may employ a round-robin type selection scheme to select messages from different requestors associated with messages in inbound queue 220.

After dispatcher 230 copies request 210 to working queue 245, persistence determiner 236 may couple with queue manager 224 to determine when queue manager 224 has persisted request 210. The entry of inbound queue 220 containing request 210 may be unlocked after request 210 is persisted from working queue 245 and dispatcher 230 may issue a "get" command to remove request 210 from inbound queue 220. Other embodiments may not include persistence determiner 236. In such embodiments, e.g., dispatcher 230 may assume that request 210 is persisted upon copying request 210 to working queue 245. For instance, copying request 210 may trigger queue manager 224 to persist request 210 from working queue 245. In such embodiments, persistence determiner 236 may be unnecessary.

Thread designator 240 may couple with searcher 232 to assign request 210 to a thread of thread pool 250 when the thread is available to process request 210. More specifically, when dispatcher 230 copies request 210 to working queue 245, thread designator 240 may check thread pool 250 for available threads 252. The next available thread may be assigned to request 210 to process request 210. When no threads are available to process request 210, dispatcher 230 may wait for a thread to become available. In other embodiments, dispatcher 230 may not copy request 210 to working queue 245 until at least one thread is available or a dirty thread is being cleaned. In several embodiments, an entry in working queue 245 may not be available for request 210 unless at least one thread is available or available to be cleaned. In further embodiments, any thread may be able to process any message such as request 210.

Thread designator 240 may assign threads to messages stored in working queue 245 in order of receipt by working queue 245 and/or by a priority associated with the messages. For instance, request 210 may include data indicating that request 210 is a high priority message. In such circumstances, thread designator 240 may assign a thread to request 210 prior to assigning threads to other, lower priority requests from the same requestor and/or lower priority requests from other requesters.

Recovery logic 242 may couple with thread designator 240 to process the messages persisted from working queue 245 after recovering from a system failure. For instance, after request 210 is removed from inbound queue 220, apparatus 200 may be shutdown by normal means such as by a user or by abnormal means such as by a hardware or software failure. The contents of working queue 245 may be cleared at shutdown and restored upon restarting apparatus 200 via queue manager 224. Then, recovery logic 242 may assign the restored messages in working queue 245 to threads, so the messages like request 210 may be processed without disrupting operation of the requestor(s) associated with the messages.

Working queue 245 may receive a copy of messages to be processed and persist the messages via queue manager 224 while threads generate committed replies to respond to the corresponding requestor(s). For example, the messages may be assigned to threads via thread designator 240 to generate committed replies such as reply 290. Reply 290 may include data responsive to request 210 and may be stored in outbound queue 280 by a thread. After committed reply 290 is stored in outbound queue 280, the copy of request 210 that is stored in working queue 245 may be removed to facilitate processing of another message.

After dispatcher 230 copies request 210 to working queue 245 and assigns a thread from available threads 252 for processing request 210, the thread may couple with rules 256 to determine rules associated with processing request 210 and couple with process logic 260 to process request 210. Rules 256 may include instructions for processing messages such as request 210. For example, rules may include data to determine a priority to associate with a type of message, e.g., a request, an inform, a portion of a wave, and a reply; whether a message should be processed in parallel with or in series with another message; additional processing to implement upon gathering data in response to a message; whether to access business logic, presentation logic, or data logic to process the message; and/or other rules.

In the present embodiment, rules 256 include wave logic 258. Wave logic 258 may describe how to process a message that is part of a wave. For instance, wave logic 258 may instruct the thread to gather data for the message and, upon receipt of data from other messages that are part of the wave, combine the data to generate a committed reply.

Upon accessing rules 256, the thread assigned to a message may access process logic 260 to process the message. Process logic 260 may include presentation logic manager 262, presentation logic 264, business logic manager 266, business logic 268, data logic 270, and database 272. Presentation logic manager 262 may manage one or more presentation logic programs like presentation logic 264 to interface with a display associated with apparatus 200. For instance, when request 210 is associated with a presentation logic program, the thread assigned to request 210 may couple with process logic 260 to display a message or graphic on the display associated with apparatus 200.

Business logic manager 266 may manage business logic programs like business logic 268 to interface with other computer systems. For example, when request 210 includes a request for data from another computer system other than apparatus 200 and/or a request to display data on a computer system other than apparatus 200, business logic manager 266 may generate a message and transmit the message to the second computer system to request the data and/or display data on the second computer system. As a further illustration, request 210 may include a request to gather data from more than one other computer system and, in response, business logic manager 266 may generate more than one messages and transmit the messages to the other computer systems to request the data. In some situations, request 210 may also include a request to process the data gathered from the other computer systems to generate a committed reply. Upon processing the data gathered from the other computer systems, business logic manager 266 may process the gathered data to generate the reply. Then, the corresponding thread may generate the reply and store the reply in outbound queue 280.

Data logic 270 may retrieve data from database 272 in response to a message such as request 210. For example, request 210 may request that data from database 272 be collected and transmitted back to the corresponding requester in reply 290. The thread assigned to request 210 may access data logic 270 to gather the data, generate the reply and store the reply in outbound queue 280.

While a thread is processing request 210 the thread may be unavailable for assignment to another message until processing is complete and the thread is cleaned. After a committed reply is generated and stored in outbound queue 280, the thread may remove the corresponding message from working queue 245 and be cleaned so the thread is available for a subsequent message.

Outbound queue 280 may persist committed replies via queue manager 224 until the replies are transmitted to the corresponding requestor(s). In many embodiments, replies may be transmitted to corresponding requestor(s) based upon the order in which the replies are stored, priorities associated with the replies, priorities associated with requestor(s), a round-robin scheme with regard to requestors associated with replies, availability of requestors to receive replies, or other such methods.

Figure 3:
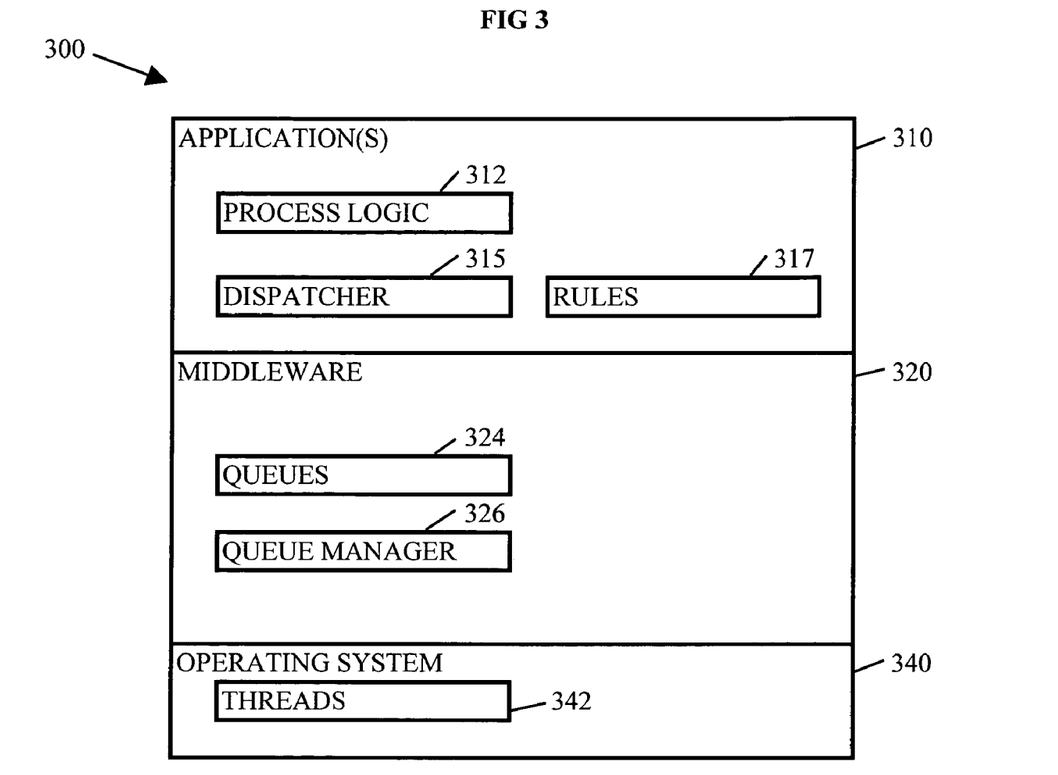
FIG. 3 depicts an example of software tiers for an embodiment such as the embodiment depicted in FIG. 2.

FIG. 3 depicts an example of software tiers for an embodiment such as the embodiment depicted in FIG. 2. Software tiers 300 include three tiers: applications 310 often referred to as upperware, middleware 320, and operating system 340. In other embodiments, software tiers 300 may include more tiers.

Applications 310 may include applications to process messages such as process logic 312, dispatcher 315, and rules 317. Process logic 312 may involve logic similar to process logic 260 of FIG. 2. For example, process logic 312 may include programs to display data on a display, interface with other computers to display data and/or gather data, and/or programs to gather data from a local database.

Dispatcher 315 and rules 317 may involve logic similar to dispatcher 230 and rules 256 of FIG. 2. For instance, dispatcher 315 may be designed to browse an inbound queue of queues 324, copy new messages to a working queue of queues 324, and remove the entries for the new messages from the inbound queue after copying.

Middleware 320 may coordinate processing of messages and persistence of messages or their corresponding replies. In particular, middleware 320 includes queues 324 and queue manager 326. Queues 324 and queue manager 326 may involve logic similar to queues 220, 245, and 280, and queue manager 224, from FIG 2. For instance, queue manager 326 may persist the contents of queues 324.

Operating system 340 may include an operating system such as Microsoft WINDOWS™, Sun SOLARIS™, IBM advanced interactive executive (AIX), or other systems adapted to interface with middleware 320. Operation system 340 includes threads 342 to be assigned to process messages by dispatcher 315 and to generate a committed reply to store in an outbound queue of queues 324.

Figure 4:
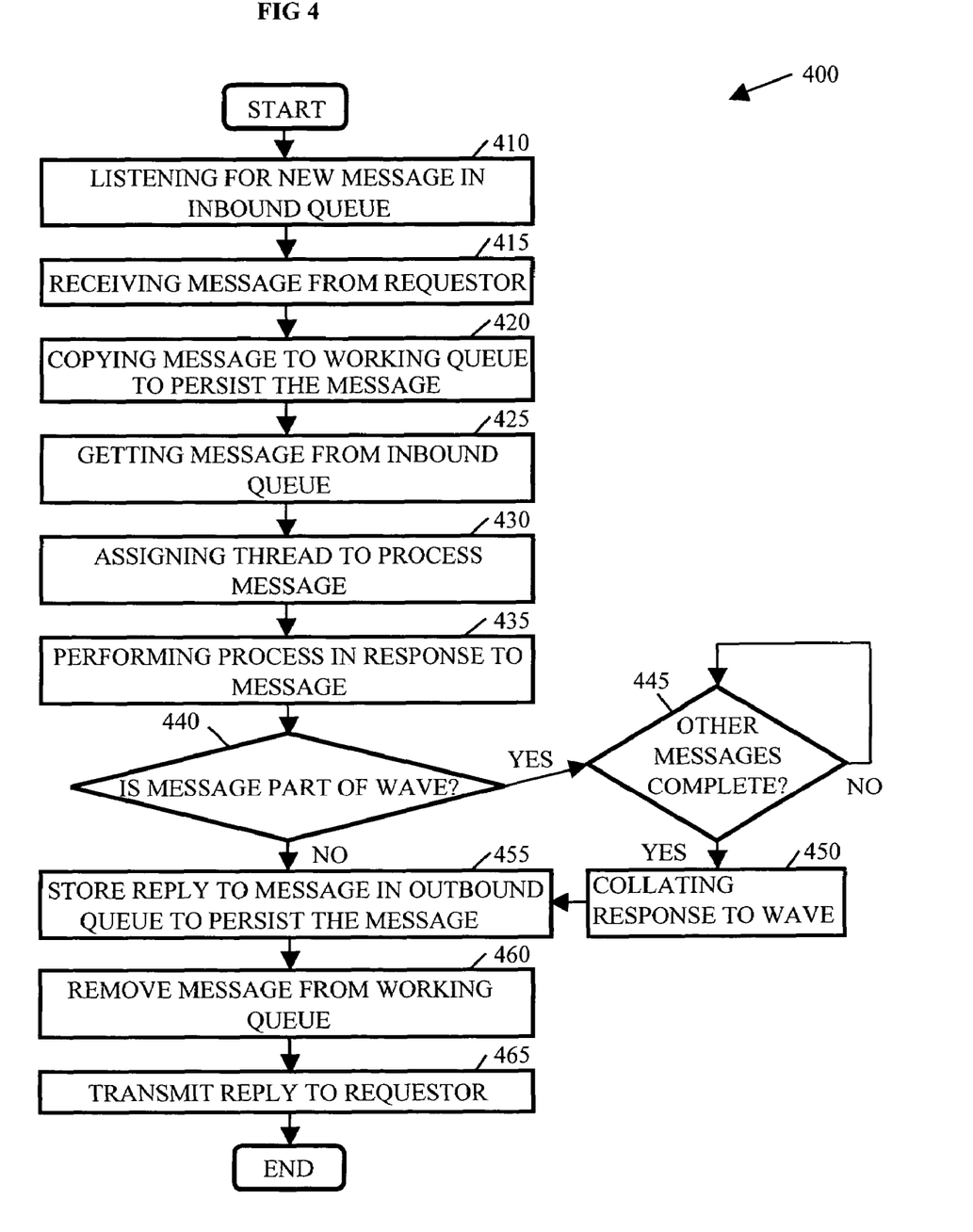
FIG. 4 depicts an example of a flow chart for a method to enhance persistence of a message.

Referring now to FIG. 4, there is shown an example of a flow chart 400 for a method to enhance persistence of a message. Flow chart 400 begins with element 410, listening for new message in inbound queue. A new message in the inbound queue may be a message received from a requestor that is waiting in the inbound queue to be processed. In some embodiments, listening may include browsing the next available entry in a first in, first out (FIFO) queue, for example. In other embodiments, a notification may indicate when a message is stored in the inbound queue or the inbound queue may be periodically searched for entries that have not been processed.

When a message is received from the requestor (element 415), the message may be validated or checked for errors prior to placing the message in the inbound queue. Placing the message in the inbound queue may persist the new message via a local queue manager. For example, a local queue manager may monitor the inbound queue for additional entries and incrementally persist the new entries. In further embodiments, the local queue manager may periodically check the inbound queue for new messages and store any new messages to non-volatile data storage such as non-volatile memory or a hard drive to persist the message in case of a system failure that clears or invalidates volatile memory in which the queues store the message.

After the new message is placed in the inbound queue, a dispatcher may identify the new message and copy the message to a working queue (element 420). Then, in element 425, the message is removed from the inbound queue to facilitate receipt of additional messages. Thus, in the event of a system failure, the new message may advantageously be recovered without additional communication with the requestor. For example, if a system failure occurs after the new message is stored in the inbound queue but before the message is copied to the working queue, the new message may by recovered from a persisted or backup copy of the new message via the local queue manager. Similarly, since the new message is not removed from the inbound queue until the new message is stored in the working queue, the new message may be recovered from the persistence of the inbound queue if a failure occurs while copying the new message.

Upon copying the new message to the working queue (element 430), the local queue manager may similarly persist the new message. Substantially simultaneously, the dispatcher may assign a thread to the message in element 430 to process the new message. More specifically, the dispatcher may identify a thread that is available to process the new message and point the thread to the entry in the working queue that contains the new message. The thread may then begin processing the message (element 435) by comparing data included in the message against rules that determine methods for processing the message. For instance, the message may include a reference to a class such as a JAVA™ class and the class may be associated with one or more methods to process the message.

Upon associating the new message with one or more rules, the new message may be processed (element 435). For example, the new message may include a request to obtain data from one or more host computers. In response, the thread assigned to the new message may generate and transmit one or intermediate messages such as a wave to request the data. When less than all of the intermediate replies are received in response to the intermediate messages, the thread may maintain the data included with the intermediate replies or store the data in memory. In some embodiments, the thread may store the data in an entry for an uncommitted reply to the requestor in an outbound queue. The reply may be uncommitted because additional data may be included in the reply before transmitting the reply to the requestor. When all of the corresponding intermediate replies have been received, the data of the intermediate replies may be collated or otherwise combined to generate a reply for the requester.

When a field of the new message designates the new message as part of a wave, the reply to the new message may remain uncommitted, waiting for processing associated with other messages of the wave to complete (element 445). After processing for the remainder of the messages associated with the wave has completed, data for each of the replies in the wave may be collated to generate a committed reply for the requestor (element 450).

The committed reply for the new message may be stored in an entry of the outbound queue (element 455), a local queue manager may persist the committed reply, and the new message may be removed from the working queue (element 460). Thus, when a system failure occurs at any time between storing the new message in the inbound queue and transmitting a reply back to the requestor, the new message or the committed reply may advantageously be recovered from the persisted copy, allowing processing of the new message to proceed or the committed reply to be transmitted without additional communication with the requester. For example, if a system failure occurs after the new message is stored in the working queue but before a committed reply is stored in the outbound queue, the new message may by recovered from a persisted copy of the new message for the working queue via the local queue manager. Similarly, if a system failure occurs while the committed reply resides in the outbound queue, the committed reply may be recovered from the persistence of the outbound queue via the local queue manager.

Once a committed reply is stored in the outbound queue, the committed reply may be transmitted to the requester (element 465). In many embodiments, processing of the new message may advantageously be performed without regard to the persistence since the local queue manager may persist the messages or the committed replies independent of or substantially independent of processing.

One embodiment of the invention is implemented as a program product for use with a computer system such as, for example, the system 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media to enhance persistence of a message by, e.g., storing the message or committed reply in a queue that is persisted prior to removing the message from another queue. It is understood that the form of the invention shown and described in the detailed description and the drawings are to be taken merely as examples. It is intended that the following claims be interpreted broadly to embrace all the variations of the example embodiments disclosed.

What is claimed is:

1. A method for enhancing persistence of a message, the method comprising:
    storing the message in an inbound queue after receiving the message;
    browsing the inbound queue to identify the message after storing the message in the inbound queue;
    copying the message to a working queue, the working queue being persisted by a queue manager, to persist the message, the message being stored, in its entirety, in both the inbound queue and the working queue concurrently;
    removing the message from the inbound queue after copying the message to the working queue and after the message is persisted from the working queue;
    assigning a thread to process the message to generate a reply prior to removing the message from the working queue; and
    storing the reply in an outbound queue after generating the reply.

2. The method of claim 1, further comprising removing the message from the working queue after storing the reply in the outbound queue.

3. The method of claim 1, further comprising restoring the message in the working queue after a system failure.

4. The method of claim 1, further comprising determining that the message is persisted prior to removing the message from the inbound queue.

5. The method of claim 1, wherein browsing comprises searching the working queue for the message as part of a wave of messages in a chronologically adjacent order to facilitate generation of the reply, wherein the message is waiting to be processed, wherein the wave of messages is a set of messages designed for simultaneous or substantially simultaneous processing.

6. The method of claim 1, wherein browsing comprises locking the message until the message is copied to the working queue.

7. The method of claim 1, wherein processing comprises assigning the message to a thread, the thread being available to process the message.

8. The method of claim 1, wherein processing the message comprises transmitting a second message to request data indicated by a content of the message and generating the reply based upon data received in response to the second message.

9. An apparatus for enhancing persistence of a message, the apparatus comprising:
    an inbound queue to receive the message from a requestor;
    a working queue to store the message;
    an outbound queue to store a reply responsive to the message;
    a queue manager to persist the message from the inbound queue and the working queue before the message is removed from the inbound queue; and a dispatcher to browse the inbound queue to identify the message after the message is stored in the inbound queue; copy the message to the working queue to persist the message, the message to be stored, in its entirety, in both the inbound queue and the working queue concurrently; remove the message from the inbound queue after the message is copied to the working queue and after the message is persisted from the working queue; and assign a thread to process the message to generate the reply in response to the message prior to removing the message from the working queue and to store the reply in the outbound queue after generating the reply.

10. The apparatus of claim 9, wherein the outbound queue is to store the reply until the reply is transmitted to the requestor.

11. The apparatus of claim 10, wherein the queue manager is configured to persist the message from the inbound queue and the reply from the outbound queue.

12. The apparatus of claim 9, wherein the dispatcher comprises a persistence determiner coupled with the queue manager to determine that the message is persisted prior to removing the message from the inbound queue, wherein the dispatcher is coupled with the working queue to wait until the thread is available to assign to the message or the thread is being cleaned, before copying the message to the working queue.

13. The apparatus of claim 9, wherein the dispatcher comprises a queue searcher to identify the message to be processed based upon priorities associated with messages stored in the inbound queue.

14. The apparatus of claim 9, wherein the dispatcher comprises a message locker to lock the message, until the message is copied into the working queue.

15. The apparatus of claim 9, wherein the dispatcher comprises recovery logic to assign the thread to process the message after a system failure.

16. The apparatus of claim 9, wherein the thread is configured to process the message based upon a rule associated with the message.

17. A storage-type machine-accessible medium containing instructions, which when executed by a machine, cause said machine to perform operations, comprising:
   storing the message in an inbound queue after receiving the message;
   browsing the inbound queue to identify the message after storing the message in the inbound queue;
   copying the message to a working queue, the working queue being persisted by a queue manager, to persist the message, the message being stored, in its entirety, in both the inbound queue and the working queue concurrently;
   removing the message from the inbound queue after copying the message to the working queue and after the message is persisted from the working queue;
   assigning a thread to process the message to generate a reply prior to removing the message from the working queue; and
   storing the reply in an outbound queue after generating the reply.

18. The storage-type machine-accessible medium of claim 17, wherein the operations further comprise removing the message from the working queue after storing the reply in an outbound queue.

19. The storage-type machine-accessible medium of claim 17, wherein the operations fun her comprise restoring the message in the working queue after a system failure based upon an order or priority associated with the message with respect to other messages in the working queue.

20. The storage-type machine-accessible medium of claim 17, wherein browsing comprises selecting a set of messages, the message being part of the set.

* * * * *

UNITED STATES PATENT AND TRADEMARK OFFICE
CERTIFICATE OF CORRECTION

PATENT NO. : 7,644,118 B2  Page 1 of 1
APPLICATION NO. : 10/660289
DATED : January 5, 2010
INVENTOR(S) : Brent Russell Phillips It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Sixteenth Day of November, 2010

David J. Kappos
*Director of the United States Patent and Trademark Office*